Feb. 19, 1957 O. W. HENRIKSON ET AL 2,782,261

SHIP SERVICE TELEPHONE MOUNTING

Filed April 26, 1955 8 Sheets-Sheet 1

INVENTORS
OSCAR W. HENRIKSON
FREDRIC E. WOOD
BY Wm. Walter Owen
ATTY.

INVENTORS
OSCAR W. HENRIKSON
FREDRIC E. WOOD
BY Wm. Walter Owen.
ATTY.

Feb. 19, 1957 O. W. HENRIKSON ET AL 2,782,261

SHIP SERVICE TELEPHONE MOUNTING

Filed April 26, 1955 8 Sheets-Sheet 3

INVENTORS
OSCAR W. HENRIKSON
FREDRIC E. WOOD
BY
Wm. Walter Owen.
ATTY.

Feb. 19, 1957 O. W. HENRIKSON ET AL 2,782,261

SHIP SERVICE TELEPHONE MOUNTING

Filed April 26, 1955 8 Sheets-Sheet 4

*INVENTORS*
OSCAR W. HENRIKSON
*BY* FREDRIC E. WOOD
Wm. Walter Owen.
ATTY.

Feb. 19, 1957 O. W. HENRIKSON ET AL 2,782,261

SHIP SERVICE TELEPHONE MOUNTING

Filed April 26, 1955 8 Sheets-Sheet 5

INVENTORS
OSCAR W. HENRIKSON
FREDRIC E. WOOD
BY Wm. Walter Owen
ATTY.

SHIP SERVICE TELEPHONE MOUNTING

Filed April 26, 1955 8 Sheets-Sheet 6

INVENTORS
OSCAR W. HENRIKSON
FREDRIC E. WOOD
BY Wm. Walter Owen.
ATTY.

INVENTORS
OSCAR W. HENRIKSON
FREDRIC E. WOOD
BY
Mc Walter Owen
ATTY.

SHIP SERVICE TELEPHONE MOUNTING

Filed April 26, 1955 8 Sheets-Sheet 8

INVENTORS
OSCAR W. HENRIKSON
FREDRIC E. WOOD
BY Wm. Walter Owen,
ATTY.

United States Patent Office 2,782,261

Patented Feb. 19, 1957

2,782,261

SHIP SERVICE TELEPHONE MOUNTING

Oscar W. Henrikson, Chicago, and Fredric E. Wood, McHenry, Ill., assignors to Automatic Electric Laboratories, Inc., Chicago, Ill., a corporation of Delaware Application April 26, 1955, Serial No. 503,851

4 Claims. (Cl. 179—100)

This invention relates in general to telephone substations and in particular to telephone subsets for installation in a naval ship where concussions or severe shocks are more likely to occur owing to rough sailing or firing of big guns.

The principal object of the invention is to provide a telephone substation capable of withstanding a severe shock without rendering the substation inoperative.

Another object of the invention is to provide an improved mounting means for the telephone handset of the substation so that the handset will not be dislodged or removed from its mounting as a result of severe shocks or concussions.

A feature of the invention relates to the improved switchhook assembly for operating the switching contacts in combination with the shock-proof mounting arrangement.

Another feature relates to the means for mounting the remaining apparatus of the telephone substation so as to withstand severe shocks and also to make the substation splash-proof as well as to prevent any moisture from diffusing into the transmitter or receiver units.

The above features and others not specifically mentioned are illustrated in the accompanying drawings.

Figure 13:
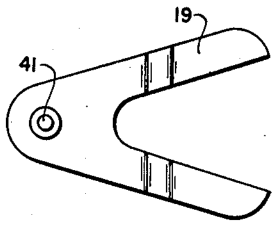
Fig. 13 is a plan view of the bifurcated arm which is used as a device for operating the switching contacts.
Figure 13A:
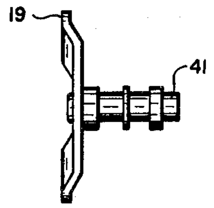

Fig. 13*a* is a view taken from the left of Fig. 13 showing the shaft attached to the bifurcated arm by means of which it is pivotally mounted.

Figure 14:
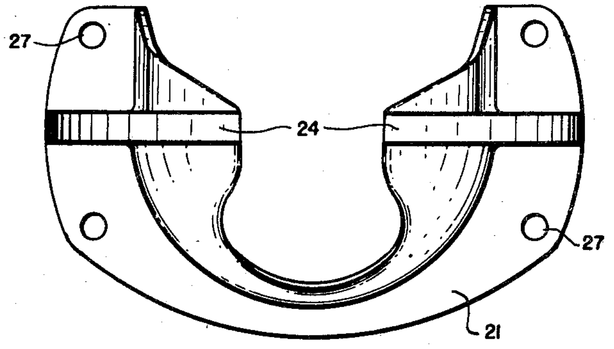

Fig. 14 is a front view of the single retaining member for holding one end of the handset.

Figure 15A:
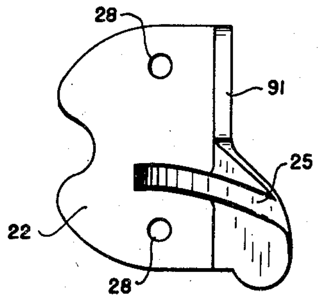

Fig. 15*a* is a view of the left retaining member of a pair for holding the other end thereof.

Figure 15B:
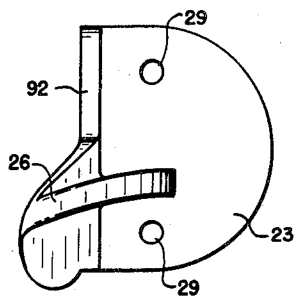

Fig. 15*b* is a view of the right retaining member of the pair.

Figure 16:
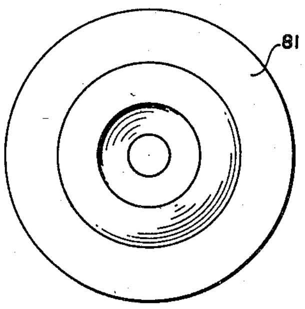

Fig. 16 is a plan view of a gasket for protecting the receiver unit.

Figure 17:
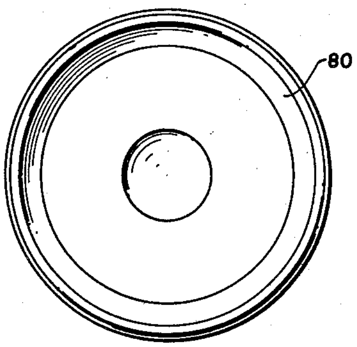

Fig. 17 is a plan view of a gasket for protecting the transmitter unit.

Figure 18:
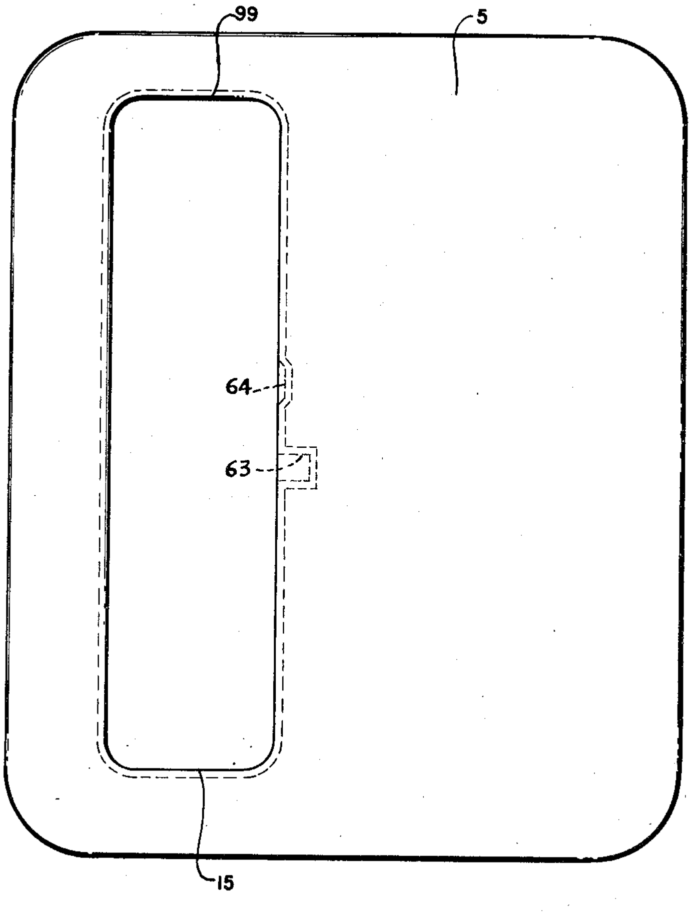

Fig. 18 shows the front plate of the case and its depressed compartment.

Figure 18A:
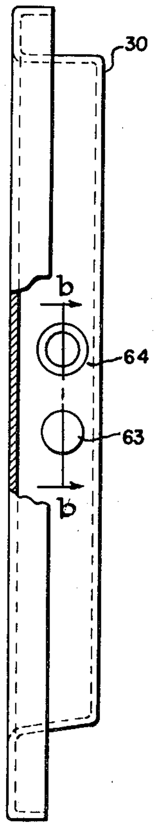

Fig. 18*a* is a view taken from the right side of Fig. 18 showing the depressed compartment with two openings of various dimensions in the wall thereof.

Figure 18B:
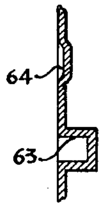

Fig. 18*b* is a cross sectional view of the shallow and deeper recesses taken along the line *b*—*b* of Fig. 18*a*.

Figure 1:
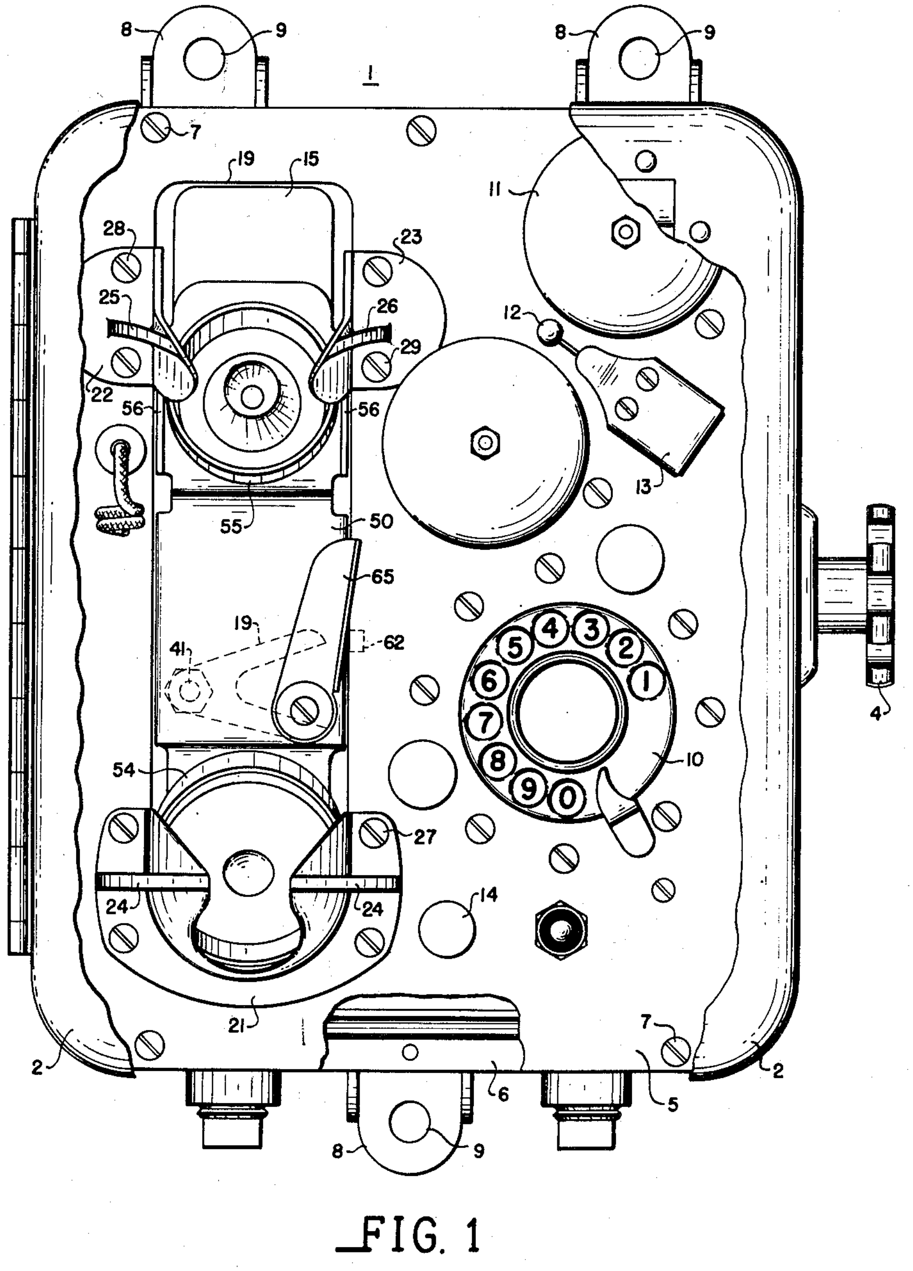
Fig. 1 is a front view of the substation set with the handset removed therefrom and part of the cover broken away.
Figure 2:
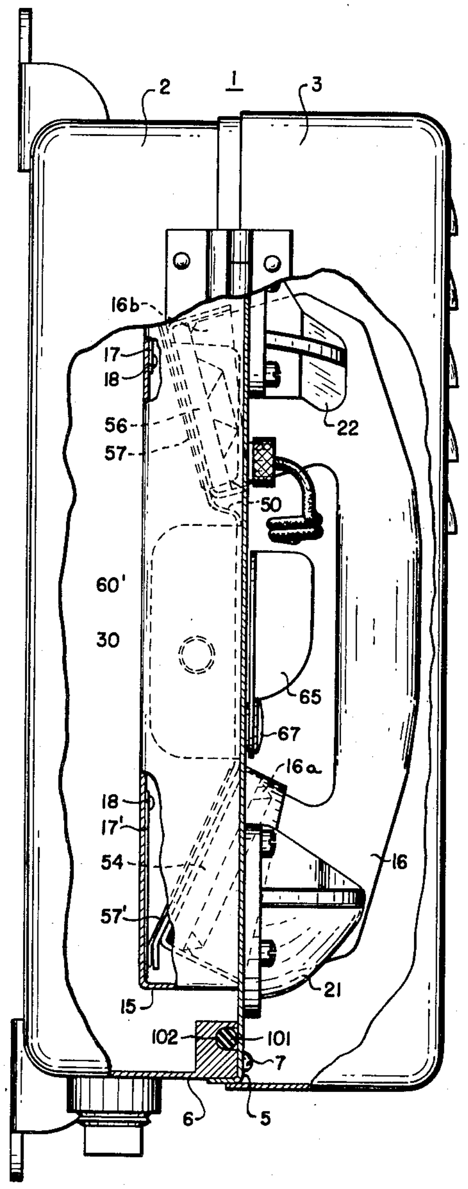
Fig. 2 is a left side view of the apparatus with part of the cover broken away and with the addition of the handset in its mounting.
Figure 8:
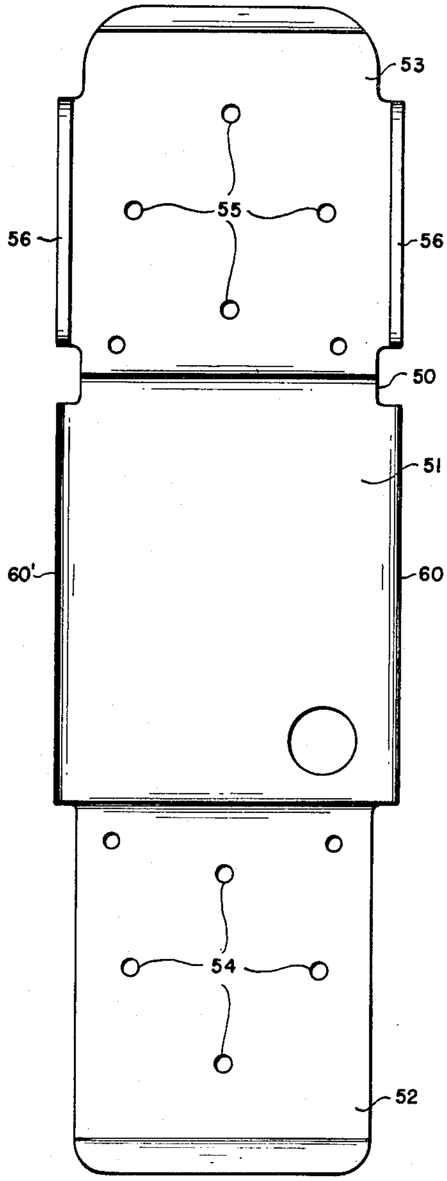
Fig. 8 is a front view of the mounting plate upon which the two receptacles may be mounted, one at each end.
Figure 3:
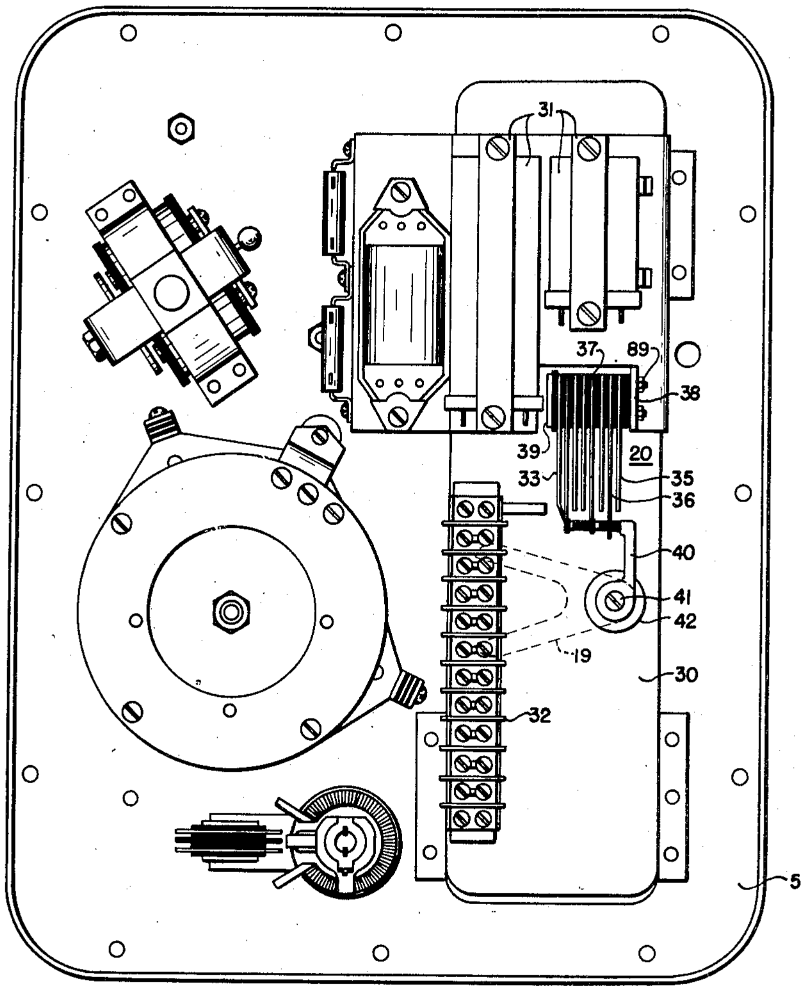
Fig. 3 is a rear view of the front plate of the casing showing the location of the switchhook contacts and actuating means therefor.
Figure 4:
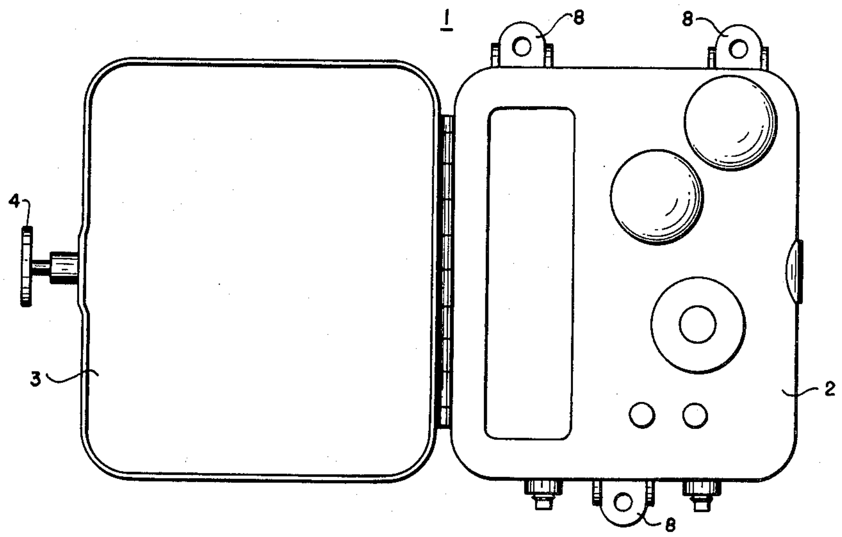
Fig. 4 shows the splash-proof case wherein the apparatus is assembled.

Referring to Figs. 1–4, the casing generally referred to as 1 as shown in Fig. 4 comprises a metal base 2, a cover 3 and a locking mechanism 4 with which the cover 3 is locked to the base 2 when the apparatus is not in use. Three metal ears such as 8 with holes 9 therein are welded to the base 2, so that casing 1 may be mounted and held firmly in place by means of large size machine screws. A shoulder or broad edge 6 (Figs. 1 and 2) is extended inward on each side of base 2 to form a shelf for mounting the front plate 5. On the edges 6, tapped holes are provided to receive the machine screws such as 7 which fasten the front plate 5 to base 2. A rubber gasket 101 is cemented in the groove 102, as shown in Fig. 2 to form a water tight enclosure when the front plate 5 is fastened.

Figure 12:
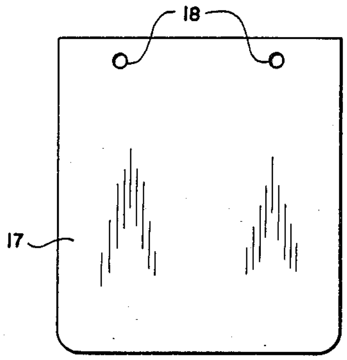
Fig. 12 is a plan view of the plate on which the mounting plate slides.

The front plate 5 comprises a flat metal plate, on which a dial 10, ringer gongs 11, clapper rod assembly 12, and ringer mechanism 13 as well as a rheostat knob 14 are mounted. The number plate of the finger hole dial is cemented in plate to make it waterproof. A depressed compartment 15 of substantial rectangular shape extending inwardly forms the left portion of the front plate 5. The length of the depressed compartment 15 is longer than the overall length of the handset 16, as best shown in Figs. 1 and 2. On each end of the bottom of the depressed compartment 15, a plate 17 or 17' (as shown in Fig. 12) made of nickel silver is provided as a sliding surface and is secured in position thru the holes 18 as shown in Fig. 2. In addition, a bifurcated arm 19, as shown in Figs. 1, 3 and 13 is rotatably fastened on the bottom of the depressed compartment 15. The manner in which the bifurcated arm 19 operates the switching contacts 20 as shown in Fig. 3 will be dealt with in a later paragraph.

A single retaining member 21 as shown in Figs. 1 and 14, and a pair of retaining members 22 and 23, as shown in Figs. 1, 15*a* and 15*b* respectively are positioned by means of machine screws 27, 28 and 29 near the ends and above the depressed compartment 15 on the front plate 5 and extend outwardly therefrom thereby forming a partial enclosure as shown in Fig. 1 for the ends of the handset.

The retaining member 21 has reinforcing ribs 24 and retaining members 22 and 23 have reinforcing ribs 25 and 26 at the points where the receiver housing **16*b* and the transmitter housing 16*a* of the handset 16 normally engage their respective retaining members. The inner contour of the retaining members conform to the outer contour of the handset housings 16*a* and 16*b***. These reinforcing ribs have been placed at this location to prevent bending or breaking of the retaining members at a time when the substation set is subject to a severe shock or concussion.

The depressed compartment 15 extending inwardly from the front plate 5 protrudes from the opposite side and forms a prominent projection 30 of substantial rectangular shape as shown in Figs. 3 and 18*a*. On the upper part of the projection 30, there is a bracket 38 supporting a number of capacitors 31 and certain other coils and equipment. A terminal strip assembly 32 is mounted on the lower left part of projection 30 upon which the telephone wires terminate for interconnection with the substation apparatus.

The switchhook spring contact assembly 20 which is also mounted on projection 30, comprises the usual stationary contact springs 35 and actuating contact springs 36. A heavy spring 33 is also provided in the spring assembly 20 to normally maintain the actuating springs 36 in engagement with springs 35. This heavy spring 33 also prevents vibration of springs 36 when subjected to extreme shocks or concussion. The contact spring assembly 20 also comprises the usual metal plate 39, insulators 37 separating the adjacent springs, the metal bracket 38 and screws 89 for securing this assembly to the bracket 38 which is welded to projection 30. An angle bar 40 is rigidly mounted on one end of a shaft 41 which is pivotally mounted in sleeve 42. The bifurcated arm 19 is rigidly mounted on the other end of shaft 41 (Fig. 13*a*) and is in turn governed by the sliding movement of the mounting plate 50 by means of the shaft 73. The mounting plate 50 has two positions, i. e., talking position and a non-talking position.

Figure 10:
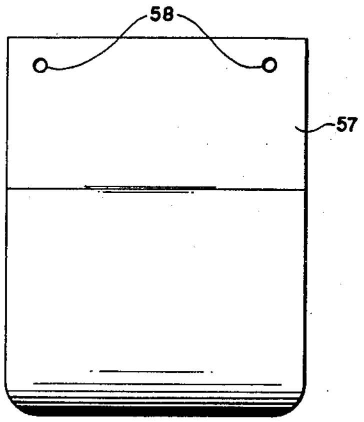
Fig. 10 is a front view of one of the spring plates.
Figure 11:
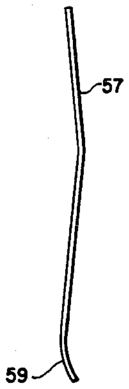
Fig. 11 is a side view of the spring plate.

The mounting plate 50 (Figs. 5–8) comprises a middle portion 51 and two end portions 52 and 53. Both end portions 52 and 53 show a downward slope, on which receptacles 54 and 55 are mounted for holding transmitter **16*a* and receiver 16*b* in their respective positions. Each of the receptacles 54 and 55 is of a cup-like shape having contours corresponding to the contours of the particular housing which it receives. End portion 53 has two flanges extending upward such as 56 to engage with the under sides of retaining members 22 and 23 for preventing the mounting plate 50 from thrusting out of the depressed compartment 15 while it rests in the talking position. Spring plates 57 and 57' are rigidly mounted at their ends underneath end portions 52 and 53 respectively by means of screws 58. Each one of the spring plates 57 and 57' as shown in Figs. 10 and 11 has a slightly convex end 59 which engages with slide plates 17 and 17' respectively for sliding operations (see Fig. 2). The free ends of spring plates 57 and 57' are tensioned away from the plate 50** as seen in Fig. 6.

The middle portion 51 of mounting plate 50 has two flanges 60 and 60' extending downward. A sleeve 61 is provided inside the right flange 60, through which a locking bolt 62 passes and cooperates with the deep circular recess 63 (Fig. 18*a*) for locking the mounting plate 50 in a lower or non-talking position. However, the bolt 62 will cooperate with the slightly depressed recess 64 (see Fig. 18*a*) when the mounting plate 50 moves to an upper or talking position.

Figure 7:
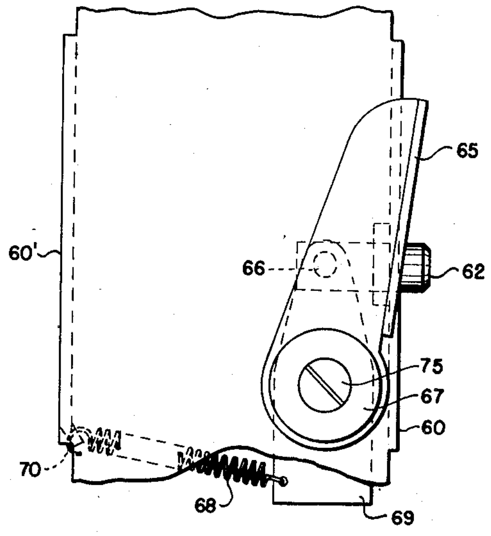
Fig. 7 is a front view of a part of the mounting plate showing the locking lever and the spring fastened to a latch bar underneath.
Figure 9:
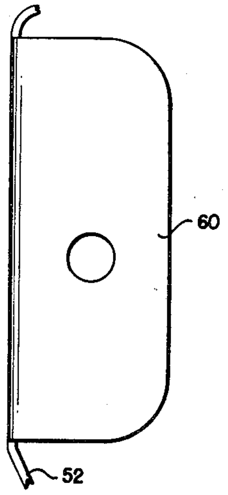
Fig. 9 is a right side view of a middle portion of the mounting plate with a hole in the center.
Figure 5:
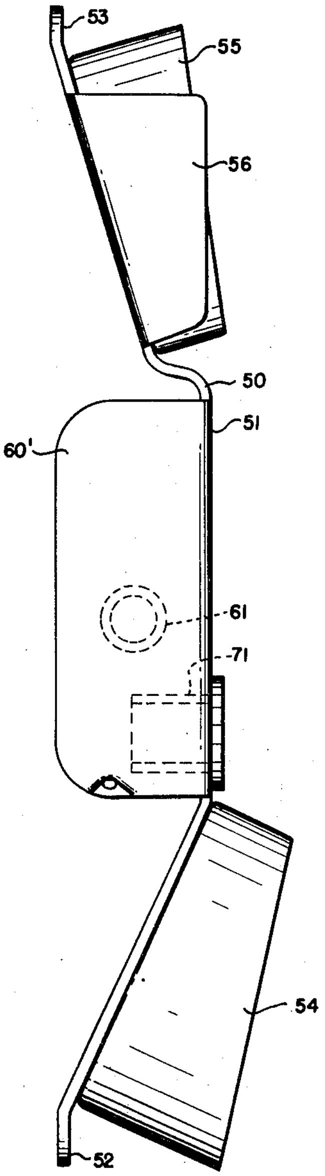
Fig. 5 is a left side view of the handset mounting plate with two receptacles spaced apart.
Figure 6:
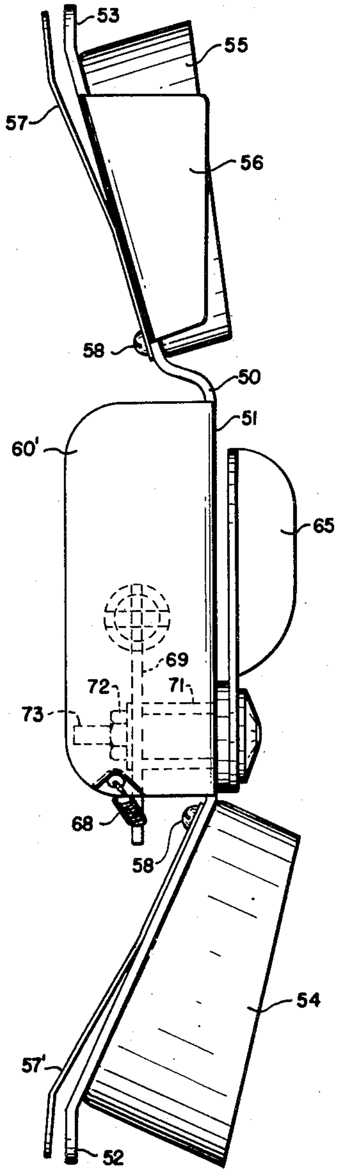
Fig. 6 is a left side view of the mounting plate with two receptacles showing the locking lever and the two spring plates underneath.

Referring now to Figs. 6 and 7 the middle portion 51 has an underneath sleeve 71, through which a shaft 73 passes and extends through member 69 and is tightened therewith by a nut 72. The member 69 is pivoted on bolt 62 by means of a pin 66. On the lower left corner of member 69, a hole 74 is provided to fasten one end of spring 68, of which, the other end 70 is fastened in a hole in an indented corner of the left flange 60'. On the top of the mounting plate 50, locking lever 65 is rigidly mounted on the shaft 73 by means of a square hole in 65 and by means of a washer 67 and a screw 75.

When the handset 16 is in its normal or non-talking position, the transmitter and receiver housings **16*a* and 16*b* are held by receptacles 54 and 55 respectively and the spring plates 57 thrust the housings against their respective retaining members 21, 22 and 23. Due to the retaining members 21, 22, 23 receptacles 54 and 55, spring plates 57 and the bolt 62, the handset is locked within the enclosure in the depressed compartment 15** capable of withstanding severe shocks and concussions.

In order to remove the handset from its enclosure, it is first necessary to operate the locking lever 65 by the left thumb for withdrawing bolt 62 from recess 63 and then press the handset inward against the tension of spring plates 57 and upward. The handset on the mounting plate 50 is now free to slide away from the retaining members. As soon as the handset is clear of the retaining members, it is removable from its mounting. In the meantime, the movement of the mounting plate 50 has caused the shaft 73 to engage the upper prong of arm 19 to rotate the bifurcated arm 19 and the angle bar 40 which, in turn, operates actuating springs 36. Upon the removal of handset 16 from its mounting, the release of any inward pressure releases tension of spring plates 57 which springs again thrust upon the mounting plate 50 and cause flanges 56 to be engaged with the under sides of edges 91 and 92 of retaining members 22 and 23 respectively. The mounting plate 50 and the bifurcated arm 19 are therefore held firmly in the talking position while bolt 62 rests on depressed hole 64.

It should be noted that when the locking lever 65 is manually operated by the left thumb to a certain degree, member 69 will engage the right flange 60 for limiting further movement of bolt 62 to prevent bolt 62 from slipping out of the sleeve 61. When the mounting plate 50 and the handset are sliding away from the retaining members, the spring plate 57 underneath the end portion 53 will finally be engaged by the top end 99 of the depressed compartment 15 for restricting any further movement of the bifurcated arm 19 which would otherwise cause further operation of the switchhook switching contacts. It also assures that bolt 62 will extend into recess 64 as previously described.

In order to replace the handset in its mounting, it is first necessary to put back the transmitter and receiver housings **16*a* and 16*b* in their respective receptacles 54 and 55 and then press the handset inward and downward against the tension of spring plates 57. The handset is now free to slide toward the retaining members and the sliding movement of the mounting plate toward the retaining members will cause the shaft 73 to restore the bifurcated arm 19 which, in turn, will restore the angle bar 40 and switching contacts assembly 20 to their respective normal positions. In the meantime, the tension of spring 68 will automatically restore member 69, upon which, the bolt 62 will pivot back to normal and extend itself into the recess 63 of the depressed compartment 15**. The apparatus is again locked in its normal or non-talking position.

From the foregoing description it will be seen that not only the manual operation of a locking lever is necessary but the vertical as well as the inward pressure should be applied to the handset before the same can be removed from its mounting. A shock-proof mounting has therefore been provided to maintain the handset in its mounting and also to prevent false operation of the switchhook spring contacts due to shocks or concussions not only in a situation where the mounting plate is in its normal position but also to hold the mounting plate in place while it rests in its talking position so as to make sure that there is no false interference of the switching contacts during talking period.

Furthermore, two gaskets 81 and 80, as shown in Figs. 16 and 17 are provided to pad receptacles 55 and 54 respectively. Gasket 81 has particular contours to fit the receiver earpiece and gasket 80 has specific contours to fit the transmitter mouthpiece. Each of the retaining members 54 and 55 has a hole in the center (not shown). Inasmuch as they are mounted in a downward slope, as already described, they are therefore self-draining and splash-proof.

While one embodiment of the invention has been disclosed, it will be understood that various modifications may be made therein which are within true spirit and scope of the invention.

What is claimed is:

1. In a telephone substation comprising a handset having a transmitter unit and a receiver unit; a handset mounting including a recess, a catch in said recess, a plurality of outer retaining members, a slidable platform mounted in said recess and having a pair of inner encircling members and a gasket for each of said encircling members adapted to encompass and receive said transmitter and receiver units respectively when the handset is placed thereon for preventing water from flowing into said units, a locking mechanism for said platform including a lever and a latch bar and means for engaging said latch bar with said catch, and maintaining said handset in its mounting when said latch bar is engaged with said catch of said recess, manual operation of said lever to lift said latch bar from said catch thus permitting said handset to be slid away from said outer retaining members, a set of switchhook switching contacts, an arm secured in said recess for operating said switching contacts and means for operating said arm in one direction to close said switching contacts in response to said sliding movement of said handset away from said outer retaining members and for operating said arm in the opposite direction to open said switching contacts in response to said sliding movement of said handset toward said outer retaining members whereby said locking mechanism is effective in cooperation with said outer retaining members for locking said units with said gaskets inside said inner encircling members.

2. In a telephone handset mounting as claimed in claim 1 wherein each of said gaskets and said encircling members having a hole as an outlet for draining any amount of water that may splash into said members and also preventing water from overflowing into said transmitter and receiver units.

3. A telephone substation comprising a handset having transmitter and receiver units thereon; a depressed compartment greater in length than the overall length of said handset; a pair of slide plates each secured on the bottom of said compartment at each end, a mounting plate having two receptacles spaced apart for holding said transmitter and receiver units when the handset is placed thereon, said mounting plate slidably engaging said slide plates, a plurality of retaining members extending above said compartment to engage said transmitter and receiver units for maintaining said units in engagement with said receptacles, a spring plate pivotally mounted underneath each of said receptacles for maintaining said receptacles in an outward position with respect to said slide plates to resiliently maintain said units in engagement with said retaining members and said recptacles, manual pressure exerted upon said handset to force said receptacles inward from said outward position against the tension of said spring plates thus permitting said handset to be slid away from said retaining members, a set of switching contacts, an arm for operating said switching contacts, means for mounting said arm in said compartment and means for operating said arm in one direction to close said switching contacts in response to said sliding movement of said mounting plate away from said retaining members and for operating said arm in the opposite direction to open said switching contacts in response to said sliding movement of said mounting plate toward said retaining members whereby said spring plates are effective in cooperation with said retaining members for locking said handset in position.

4. A telephone substation comprising a handset having transmitter and receiver units thereon, a depressed compartment greater in length than the overall length of said handset having a deep and a shallow recess therein, a slide plate secured at each end of said depressed compartment providing a sliding surface, a mounting plate having two receptacles spaced apart to receive said transmitter and receiver units, said mounting plate having a talking and a non-talking position, a spring plate pivotally secured underneath each of said receptacles, each of said spring plates having a convex end for slidably engaging said slide plates, a locking bolt on said mounting plate cooperating with said recesses, a locking lever for controlling said locking bolt, a plurality of retaining members extending above said depressed compartment, said retaining members effective in case said units are engaged with said receptacles and said mounting plate is moved to said non-talking position for maintaining said units in said receptacles, means for engaging said bolt with said deep recess when said mounting plate is in said non-talking position, manual operation of said locking lever to withdraw said locking bolt from said deep recess and manual pressure exerted upon said handset to force said receptacles inward against the tension of said spring plates permitting said handset to be slid away from said retaining members, a set of switching contacts, a bar for operating said switching contacts, an arm for controlling the operation of said bar, a first shaft, means for mounting said bar and said arm on said first shaft, a second shaft in said mounting plate, said second shaft extending through said mounting plate and engaging said arm whereby movement of said mounting plate causes movement of said arm and said bar to operate said switching contacts, two of said retaining members, said spring plates, said locking bolt and said shallow recess effective in case said mounting plate is moved to said talking position for holding said plate in said position.

References Cited in the file of this patent

UNITED STATES PATENTS

| | | |
|---|---|---|
| 2,375,681 | Obergfell | May 5, 1945 |
| 2,439,218 | Obergfell | Apr. 6, 1948 |